Patented Apr. 15, 1947

2,418,988

UNITED STATES PATENT OFFICE 2,418,988

REMOVAL OF MUCK FROM WASH OIL

Daniel K. Segur, Buffalo, N. Y., assignor to Donner-Hanna Coke Corporation, Buffalo, N. Y., a corporation of New York No Drawing. Application August 30, 1944, Serial No. 552,015

9 Claims. (Cl. 196—15)

This invention relates to a method of treating wash oil to remove extraneous adulterants and thereby render the oil suitable for further use. More particularly the invention is concerned with the treatment of wash oil of the kind employed in connection with the scrubbing of gases produced in the destructive distillation of coal to recover benzol, toluol and the higher boiling homologues in the benzene series, all commonly known as light oils.

The gases, which are scrubbed for the purpose described, also contain undesirable constituents, principally styrene, indene and cyclopentadiene. These are assimilated by the wash oil along with the light oils and are not effectively removed in the subsequent stripping operations to which the wash oil is subjected to isolate the recovered light oils. These adulterants, being polymerizable, form into solid or semi-solid compounds and clog up and otherwise prevent the efficient operation of the apparatus employed in connection with the recovery of the light oils.

The principal object of the present invention, therefore, is to provide a method of removing from wash oil of the character described the polymerizable constituents which are assimilated in connection with the recovery of the light oils, whereby to enable the continued use of the wash oil without impairing the effectiveness of the apparatus involved.

A further object is a method which is simple, effective and economical, this object contemplating a method which is wholly chemical in character, which is carried out in liquid phase at all stages, and which does not involve distillation or fractional condensation, and hence which does not require the use of apparatus heretofore considered essential.

A still further object is a method of treating the wash oil in such a manner that it will retain all of its original beneficial properties, only those extraneous adulterants not originally present being removed.

In carrying out the method, the wash oil from which styrene, indene and cyclopentadiene are to be removed and an aqueous, caustic soda solution are heated to a temperature below foaming (the boiling point of the soda solution) and the mixture is agitated mechanically, by air or in any other suitable manner for a portion of the heating period. Thereby the extraneous compounds present in the wash oil are caused to polymerize, forming solids and semi-solids as they do and settling out in the form of sludge. Upon conclusion of the settling operation, the sludge containing the extraneous adulterants may be drawn off, the treated oil remaining being free of the undesirable constituents assimilated in connection with the recovery of the light oils, and thus suitable for further use.

It is to be noted that the principal adulterants removed by the method, namely, styrene, indene and cyclopentadiene are neutral chemically and hence that the caustic soda and impurities do not react as alkalies and acids, the caustic soda retaining its identity throughout the treatment of the wash oil. At temperatures in the range contemplated, however, its presence rapidly accelerates polymerization of the extraneous compounds. In other words, the caustic soda promotes polymerization of such compounds without losing its identity, settling out along with the polymerized adulterants. Thus polymerization, which cannot be effected by heat alone or by caustic soda alone, can be accomplished readily with the aid of caustic soda when the proper temperatures are employed.

From the foregoing, it will be apparent that the method is not only simple and effective but is highly economical from the standpoints both of the apparatus required and of operating costs. All stages of the method being carried out in liquid phase, any need for apparatus for distillation or fractionation is avoided. A further advantage obtained is that the treated wash oil is, for all practical purposes, restored to its original condition, it being understood in this connection that, although the primary purpose of the caustic soda is to effect the removal of extraneous compounds which are neutral, it will, of course, at the same time convert into salts any acidic compounds which may be present and these will be removed along with the neutral compounds.

As an example of the practice of the invention 300 gallons of a 12% aqueous, caustic soda solution may be mixed with 7000 gallons of wash oil containing a high percentage of styrene, indene and cyclopentadiene as a result of the use of the oil for scrubbing gases of the character described. This mixture is then heated by a steam coil to a temperature between the substantial limits of 70° C. and 90° C. and maintained at such temperature for 28 hours. For the first four hours the mixture is agitated with a circulating pump while at the same time air is introduced, the use of caustic soda in solution and agitation of the mixture in the manner described insuring intimate contact between the caustic soda and the wash oil. After four hours, agitation is suspended and the application of heat is continued for the remaining 24 hours. Thereupon the mixture is maintained through a cooling stage and the polymerized compounds which settle as sludge are drawn off, the sludge including not only the polymerized compounds and incidental acidic impurities converted into salts but also the caustic soda and the water in which the latter was in solution.

The method described may be availed of to particular advantage in maintaining the muck content of the wash oil of scrubbing apparatus below a percentage at which clogging-up of the apparatus or serious impairment to the heat transfer properties thereof are likely to occur. This may be attained, for example, by withdrawing relatively small quantities of wash oil regularly from the apparatus and replacing the wash oil so withdrawn by equal amounts of unadulterated wash oil, preferably partly adulterated wash oil which has been treated in accordance with the method and partly new oil. The amount of wash oil which may be withdrawn and replaced and the relative amounts of unadulterated wash oil required will vary, of course, depending upon the character of the gases being scrubbed, the type of wash oil and other factors. Analysis of the wash oil in the system from time to time will, however, show the amount of extraneous compounds present and will indicate whether the percentage thereof is increasing or decreasing. The amounts of wash oil withdrawn and replaced, therefore, may be regulated in accordance with such analysis. Although reference is made to batch treatment of the wash oil and to periodic withdrawal and replacement of portions of the wash oil, this is intended by way of example only as the wash oil may be withdrawn from the apparatus, treated and returned in a continuous operation, the rate of withdrawal and return being controlled so that the accumulation of extraneous compounds in the wash oil does not exceed a predetermined permissible percentage.

I claim as my invention:

1. The method of treating wash oil which has been employed in scrubbing gases to recover light oils, the wash oil having in such use assimilated adulterants of the nature of styrene, indene and cyclopentadiene and which are polymerizable, which method consists in adding caustic soda to the wash oil, heating the mixture for a period of at least several hours, agitating the mixture during a portion of the heating period, and separating the adulterants which are polymerized by the treatment described.

2. The method of treating wash oil which has been employed in scrubbing gases to recover light oils, the wash oil having in such use assimilated adulterants of the nature of styrene, indene and cyclopentadiene and which are polymerizable, which method consists in adding caustic soda to the wash oil, heating the mixture for a period of at least several hours, agitating the mixture during a portion of the heating period, and permitting the adulterants which are polymerized by the treatment described to settle out in the form of sludge.

3. The method of treating wash oil which has been employed in scrubbing gases to recover light oils, the wash oil having in such use assimilated adulterants of the nature of styrene, indene and cyclopentadiene and which are polymerizable, which method consists in adding caustic soda to the wash oil, heating the mixture to, and maintaining it for a period of at least several hours at, a temperature below the boiling point, agitating the mixture during a portion of the heating period, and separating the adulterants which are polymerized by the treatment described.

4. The method of treating wash oil which has been employed in scrubbing gases to recover light oils, the wash oil having in such use assimilated adulterants of the nature of styrene, indene and cyclopentadiene and which are polymerizable, which method consists in adding a caustic soda solution to the wash oil, heating the mixture to, and maintaining it for a period of several hours at, a temperature below the boiling point, agitating the mixture during a portion of the heating period, and permitting the polymerized adulterants to settle out in the form of sludge.

5. The method of treating wash oil which has been employed in scrubbing gases to recover light oils, the wash oil having in such use assimilated at least one of the adulterants styrene, indene and cyclopentadiene, which method consists in adding a caustic soda solution to the wash oil, heating the mixture to, and maintaining it for a period of at least several hours at a temperature below the boiling point, agitating the mixture during a portion of the heating period, and separating the adulterants which are polymerized by the treatment described.

6. The method of treating wash oil which has been employed in scrubbing gases to recover light oils, the wash oil having in such use assimilated at least one of the adulterants styrene, indene and cyclopentadiene, which method consists in adding a caustic soda solution to the wash oil, heating the mixture to, and maintaining it for a period of at least several hours at, a temperature below the boiling point, agitating the mixture during a portion of the heating period, and permitting the polymerized adulterants to settle out as sludge.

7. The method of treating wash oil which has been employed in scrubbing gases to recover light oils, the wash oil having in such use assimilated at least one of the adulterants styrene, indene and cyclopentadiene, which method consists in adding an aqueous caustic soda solution to the wash oil, heating the mixture to, and maintaining it for approximately twenty-eight hours at, a temperature between 70° C. and 90° C., agitating the mixture for approximately the first four hours of the heating period, and permitting the polymerized adulterants to settle out as sludge.

8. The method of treating wash oil which has been employed in scrubbing gases to recover light oils, the wash oil having in such use assimilated adulterants of the nature of styrene, indene and cyclopentadiene and which are polymerizable, which method consists in adding an aqueous caustic soda solution to the wash oil, heating the mixture to, and maintaining it for a period of at least several hours at, a temperature below the boiling point, agitating the mixture during such period, extending the heating period without agitation and thereafter allowing the mixture to cool, and separating the adulterants which are polymerized by the treatment described.

9. The method of treating wash oil which has been employed in scrubbing gases to recover light oils, the wash oil having in such use assimilated adulterants of the nature of styrene, indene and cyclopentadiene and which are polymerizable, which method consists in adding a 10–15% aqueous caustic soda solution to the wash oil, heating the mixture to, and maintaining it for a period of at least several hours at, a temperature below the boiling point, agitating the mixture during such period, extending the heating period without further agitation and thereafter allowing the mixture to cool, and permitting the polymerized adulterants to settle out in the form of sludge.

DANIEL K. SEGUR.

REFERENCES CITED

The following references are of record in the file of this patent:

UNITED STATES PATENTS

| Number | Name | Date |
| --- | --- | --- |
| 2,314,256 | Vaughan | Mar. 16, 1943 |
| 2,314,257 | Vaughan et al. | Mar. 16, 1943 |
| 2,076,392 | Williams | Apr. 6, 1937 |
| 2,249,793 | Soday | July 22, 1941 |
| 1,949,746 | Jones | Mar. 6, 1934 |
| 2,256,405 | McMillan | Sept. 16, 1941 |